United States Patent
Weng et al.

(10) Patent No.: US 7,609,180 B2
(45) Date of Patent: Oct. 27, 2009

(54) METHOD AND APPARATUS FOR BUS ENCODING AND DECODING

(75) Inventors: Tsung-Hsi Weng, Tainan County (TW); Wei-Hau Chiao, Hsinchu (TW); Chung-Ping Chung, Hsinchu (TW); Chih-Wei Hsu, Hsinchu (TW); Yeu-Horng Shiau, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 240 days.

(21) Appl. No.: 11/864,990

(22) Filed: Sep. 29, 2007

(65) Prior Publication Data
US 2008/0235417 A1    Sep. 25, 2008

(30) Foreign Application Priority Data
Mar. 19, 2007    (TW) .............................. 96109298 A

(51) Int. Cl.
*H03M 5/00*    (2006.01)

(52) U.S. Cl. .............................. 341/55; 341/50; 341/56
(58) Field of Classification Search .................. 341/55, 341/56
See application file for complete search history.

(56) References Cited

U.S. PATENT DOCUMENTS

| | | | |
|---|---|---|---|
| 6,538,584 B2 * | 3/2003 | Borkar et al. ................. | 341/58 |
| 6,943,706 B2 * | 9/2005 | Pappalardo et al. ........... | 341/50 |
| 7,358,868 B2 * | 4/2008 | Pappalardo et al. ........... | 341/55 |

* cited by examiner

*Primary Examiner*—Khai M Nguyen
(74) *Attorney, Agent, or Firm*—Jianq Chyun IP Office

(57) ABSTRACT

A method and an apparatus for bus encoding and a method and an apparatus for bus decoding are provided. The methods and apparatuses for bus encoding/decoding use a discontinuous pattern table (DPT) to store discontinuous pattern pairs. The tables are kept synchronous in both transmitter and receiver ends. After transmitting the first data in a discontinuous pattern pair, the second data may be transmitted by merely informing the receiver end through a control line instead of transmitting the second data by the bus.

22 Claims, 7 Drawing Sheets

METHOD AND APPARATUS FOR BUS ENCODING AND DECODING

CROSS-REFERENCE TO RELATED APPLICATION

This application claims the priority benefit of Taiwan application serial no. 96109298, filed Mar. 19, 2007. All disclosure of the Taiwan application is incorporated herein by reference.

BACKGROUND OF THE INVENTION

1. Field of the Invention

The present invention relates to bus encoding and decoding, and more particularly to encoding and decoding of discontinuous bus data.

2. Description of Related Art

In a computer system, various devices transmit data among each other through buses. The data passes through the bus at an extremely high rate, such that the status of bus lines is rapidly converted between 0 and 1. The bus line transition between 0 and 1 results in charging or discharging of bus wires, and the capacitance value of a system bus is hundreds of times of, even thousands of times of, that of an internal logic circuit. Therefore, the bus is highly power-consuming in the system, and the power consumed during data transmission is substantially in direct proportion to the number of bus line bit-transitions.

For the purpose of power saving, the number of bus line bit-transitions must be reduced, and the most efficient way is bus encoding. As long as a receiver decodes the transmitted data correctly, a transmitter can encode the data into forms that result in fewer bus line bit-transitions. Taking an instruction address bus which transmits instruction addresses for example. Since most program instructions are sequentially executed, consecutive addresses appear on the bus. The encoder may apply Gray Code to make the consecutive addresses differ form each other for only one bit after encoding, thereby greatly reducing the electricity consumed by data transmission.

However, the bus transmits not only consecutive data, but also discontinuous data. For example, branch instructions might cause instruction addresses being discontinuous. Up to the present, various technologies have been developed to encode consecutive bus data to reduce the the number of bus line bit-transitions, such as Gray Code, Zero-Transition (T0), and burst mode. However, we still needs a solution to encode discontinuous bus data to reduce the the number of bus line bit-transitions.

SUMMARY OF THE INVENTION

The present invention is directed to a method and an apparatus for bus encoding, which encodes discontinuous bus data to reduce the number of bus line bit-transitions.

The present invention is directed to a method and an apparatus for bus decoding, which decodes discontinuous bus data together with the aforementioned encoding method and apparatus, so as to reduce the number of bus line bit-transitions.

The present invention provides an apparatus for bus encoding, which includes a discontinuous pattern encoder, a consecutive pattern encoder, and a data transmitter. A discontinuous pattern table (DPT), which is built in the discontinuous pattern encoder, stores indices and data in pairs. If a previous data (data transmitted last time) and a current data (data to be transmitted this time) are discontinuous, and the DPT does not contain an index the same as the previous data, the discontinuous pattern encoder pairs the previous data and the current data up and stores them into the DPT by taking the previous data as an index. If the DPT contains the index the same as the previous data, the discontinuous pattern encoder outputs data corresponding to the previous data. The consecutive pattern encoder encodes the current data through the consecutive data encoding method, and outputs an encoding result. The data transmitter is coupled to the discontinuous pattern encoder, the consecutive pattern encoder, a bus, and a control line. If the current data is equal to outputted data of the discontinuous pattern encoder, the data transmitter asserts the control line and freezes the bus (which means that the statuses of all the bus wires are kept the same); otherwise, the control line is de-asserted, and the encoding result of the consecutive pattern encoder is outputted to the bus.

The present invention further provides an apparatus for bus decoding, which includes a discontinuous pattern decoder, a consecutive pattern decoder, and a data receiver. A DPT, which is built in the discontinuous pattern decoder, stores indices and data in pairs. If the DPT contains the index the same as previous data (the data received last time), the discontinuous pattern decoder outputs data corresponding to the previous data. The consecutive pattern decoder is coupled to a bus, so as to decode an input from the bus through the consecutive data decoding method and to output the decoded data. The data receiver is coupled to the discontinuous pattern decoder, the consecutive pattern decoder, the bus, and a control line. If the control line is asserted, the data receiver outputs the output data of the discontinuous pattern decoder and takes it as the current data; otherwise, the data receiver outputs the output data of the consecutive pattern decoder and takes it as the current data. Subsequently, if the previous data and the current data are discontinuous, and the DPT does not contain the index the same as the previous data, the discontinuous pattern decoder pairs the previous data and the current data up and stores them into the DPT by taking the previous data as an index.

The present invention further provides a method for bus encoding, which includes steps as follows. (a) Use a DPT to store indices and data in pairs. (b) If the DPT contains an index the same as the previous data, it outputs data corresponding to the previous data. (c) Consecutive pattern encoder encodes the current data using the consecutive data encoding method, and outputs the encoding result. (d) If the current data is equal to the output data in Step (b), a control line is asserted and the bus is frozen; otherwise, the control line is de-asserted, and the encoding result in Step (c) is outputted to the bus. (e) If the previous data and the current data are discontinuous and the DPT does not contain an index the same as the previous data, the previous data and the current data are paired up and stored in the DPT by taking the previous data as an index.

The present invention further provides a method for bus decoding, which includes the steps as follows. (a) Use a DPT to store indices and data in pairs. (b) If the DPT contains an index the same as the previous data, it outputs data corresponding to the previous data. (c) Consecutive pattern decoder decodes the input from the bus using the consecutive data decoding method, and outputs the decoded data. (d) If a control line is asserted, the output data in Step (b) is outputted as the current data; otherwise, the output data in Step (c) is outputted as the current data. (e) If the previous data and the current data are discontinuous and the DPT does not contain an index the same as the previous data, the previous data and the current data are paired up and stored into the DPT by taking the previous data as an index.

The apparatus and method for bus encoding/decoding provided by the present invention employ the DPT to store discontinuous pattern pairs. Both transmitter and receiver have to keep the synchronization of the discontinuous pattern tables (DPT) at any moment. After transmitting the first data (the index) of a discontinuous pattern pair, the second could be transmitted by merely informing a receiving end through a control line instead of transmitting the second data by the bus. In this manner, not only the power consumption of the bus, but also the wasted heat generated by the system is reduced.

In order to make the aforementioned and other objects, features, and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The encoding apparatus, the decoding apparatus, the encoding method, and the decoding method provided by the present invention focus on data transmitted on the bus. For example, the data transmitted on the instruction address bus are instruction addresses. Moreover, the object of encoding and decoding in the present invention is a piece of data that transmitted through the bus in one time.

The data on the bus can be classified into consecutive data and discontinuous data. The so-called consecutive data is arithmetic sequence with a constant difference of a predetermined value among each other. Taking an instruction address bus for example, the addresses of sequentially executed instructions are consecutive data, and the address of the branch instruction and its target address are discontinuous data. Due to the locality of the program execution, it is quite probably that the branch instructions are executed repeatedly, thereby causing the discontinuous data to appear repeatedly. According to the repeatedly-appearing characteristic, the present invention provides a method for encoding and decoding discontinuous data and a corresponding apparatus used for implementing the method.

Figures 1, 2:
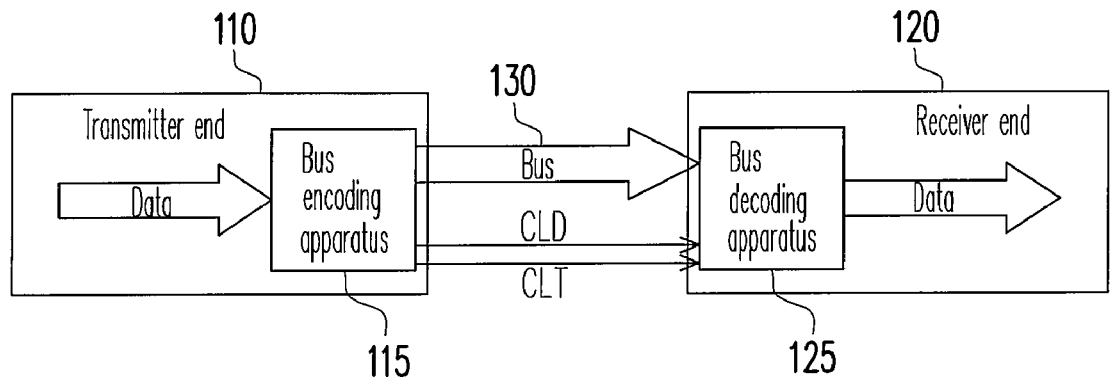
FIG. 1 is a schematic view of an apparatus for bus encoding and decoding according to an embodiment of the present invention.
FIG. 2 is a schematic view of for encoding both consecutive and discontinuous data according to an embodiment of the present invention.

FIG. 1 is a schematic view of an apparatus for bus encoding and decoding according to an embodiment of the present invention. A data transmitter end 110 includes a bus encoding apparatus 115, and a data receiver end 120 includes a bus decoding apparatus 125. The encoding apparatus 115 encodes the data to be transmitted. The encoded data is transmitted to the decoding apparatus 125 through the bus 130 and the control lines CLD and CLT. The decoding apparatus 125 recovers the data to the original data before the encoding process.

In this embodiment, the consecutive data is encoded through Zero-Transition (T0), and the discontinuous data is encoded through the DPT provided by the present invention. The DPT which stores discontinuous pattern pairs is as shown in the following Table 1. In Table 1, the first data pair is (0008, 0100), and the second data pair is (0108, 0000). Each data pair includes two data sequentially appeared on the bus. $P_i$ represents the first one; $P_{i+1}$ represents the second. When looking up the DPT, $P_{i+1}$ in the same pair can be looked up by taking $P_i$ as an index, and thus, $P_{i+1}$ is called a data corresponding to $P_i$.

TABLE 1

| Paradigm of DPT | |
|---|---|
| $P_i$ | $P_{i+1}$ |
| 0008 | 0100 |
| 0108 | 0000 |
| ... | ... |

The functions of the control lines CLD and CLT are shown in Table 2 below. When the control line CLD is asserted (for example, the voltage is at a potential of logic 1), it represents that the bus data is encoded through the DPT. When the control line CLD is de-asserted (for example, the voltage is at a potential of logic 0), and the control line CLT is asserted, it represents that the bus data is encoded through Zero-Transition. When the control lines CLD and CLT are both de-asserted, it represents that the original data without being encoded is transmitted on the bus. Of course, the present invention is not limited to the above definition, but focuses on notifying the receiver end whether the data being transmitted had been encoded or not and which encoding method was adopted. The number of control lines and arrangement of the statuses of control lines may be adjusted upon actual requirements. For example, in other embodiments, the consecutive data encoding methods, other than T0, may be used, and meanwhile, the control lines must be adjusted correspondingly.

TABLE 2

| | Status of control line | |
|---|---|---|
| | CLT = 0 | CLT = 1 |
| CLD = 0 | Original Data | T0 |
| CLD = 1 | DPT | DPT |

FIG. 2 shows a paradigm of data transmission in this embodiment, in which the left part of the table shows the data transmitted on the bus and the statuses of the control lines CLD and CLT, and the right part shows the DPT of the paradigm. The bus shown in FIG. 2 is an instruction address bus. Each instruction is 4-byte long, so the consecutive data is an arithmetic sequence with a difference of 4 bytes among each other.

Firstly, the first data 0000 does not have a previous data for reference and must be transmitted directly. Next, the data 0004 and 0008 are consecutive data, which can be encoded through Zero-Transition. The receiver end is informed through the control line CLT, instead of transmitting through the bus. i.e., it is not necessary to change the status of the bus. Once being informed that the control line CLD is 0 and the CLT is 1, the receiver end determines that the encoding method is Zero-Transition, and obtains the current data by adding four to the previous data that was transmitted last time.

The next data 0100 is a discontinuous data which appears for the first time and forms a data pair (0008, 0100) with the previous data. So the data 0100 must be transmitted directly. In addition, (0008, 0100) must be inserted into the DPT, as shown by the dashed arrow in FIG. 2. The transmitter end and the receiver end have the same DPT, which is updated synchronously.

The next data 0104 and 0108 are consecutive data, and also encoded through Zero-Transition, which can be achieved merely by informing the receiver end through the control line CLT.

The next data 0000 is also a discontinuous data which appears for the first time and forms a data pair (0108, 0000) with the previous data. So the data 0000 must be transmitted directly, and (0108, 0000) is inserted into the DPT, as shown by the dashed arrow in FIG. 2.

The next data 0004 and 0008 are both consecutive data, and also encoded through Zero-Transition, which can be achieved merely by informing the receiver end through the control line CLT.

The next discontinuous data 0100 forms a data pair (0008, 0100) with the previous data, and the data pair (0008, 0100) has already existed in the DPT, as shown by the solid arrow in FIG. 2. Therefore, the receiver end is informed through the control line CLD, instead of transmitting the discontinuous data 0100 through the bus And then, after detecting that the control line CLD is 1, the receiver end looks up the DPT by taking the previous data 0008 as an index, and the obtained corresponding data 0100 is the current data.

The next data 0104, 0108, and 010C are all consecutive data, and also encoded through the Zero-Transition, which can be achieved by merely informing the receiver end through the control line CLT.

The paradigm in FIG. 2 has thirteen data in total. However, in fact, only three data are transmitted through the bus, and the others are transmitted, without changing the status of the bus. Although the status of the control line is often changed, the number of bus wires is generally far more than that of the control lines. For example, the addressing of 1 megabytes memory requires an address bus of 20 bits. Generally speaking, the method for encoding and bus decoding in this embodiment may greatly decrease the number of bus line bit-transitions, so as to save power.

Figure 3:
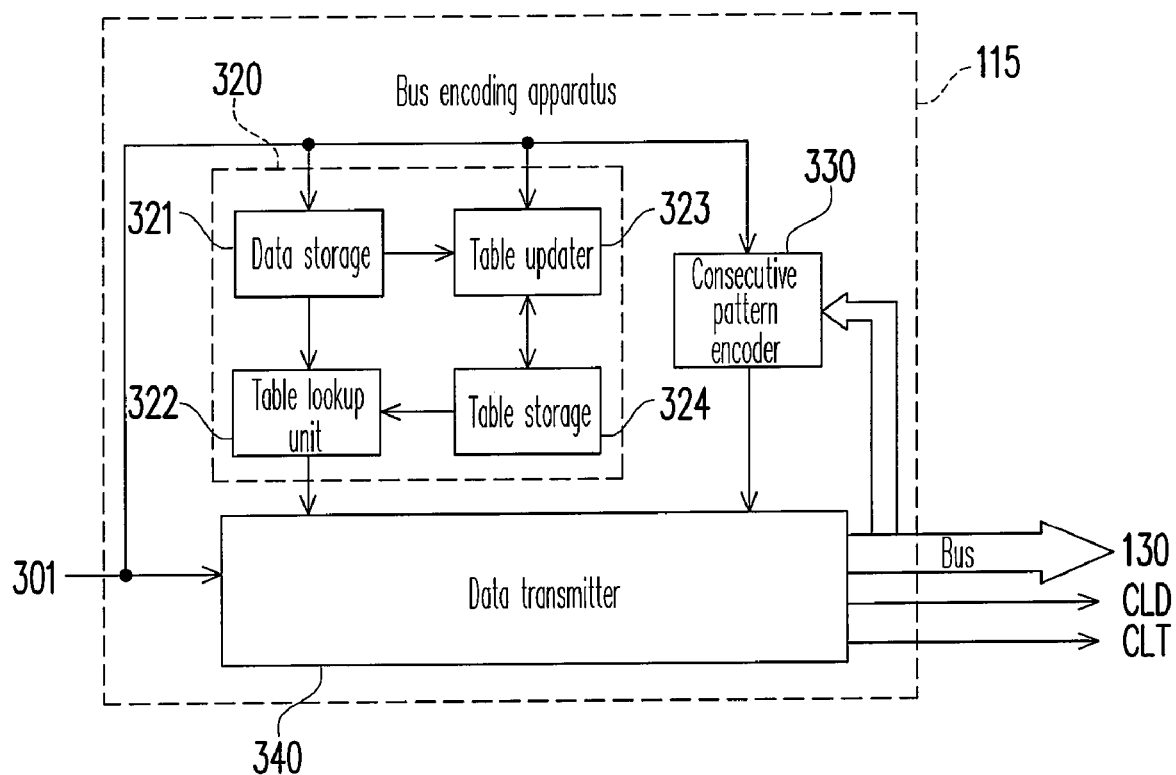
FIG. 3 is a block diagram of the bus encoding apparatus in FIG. 1.
Figure 4:
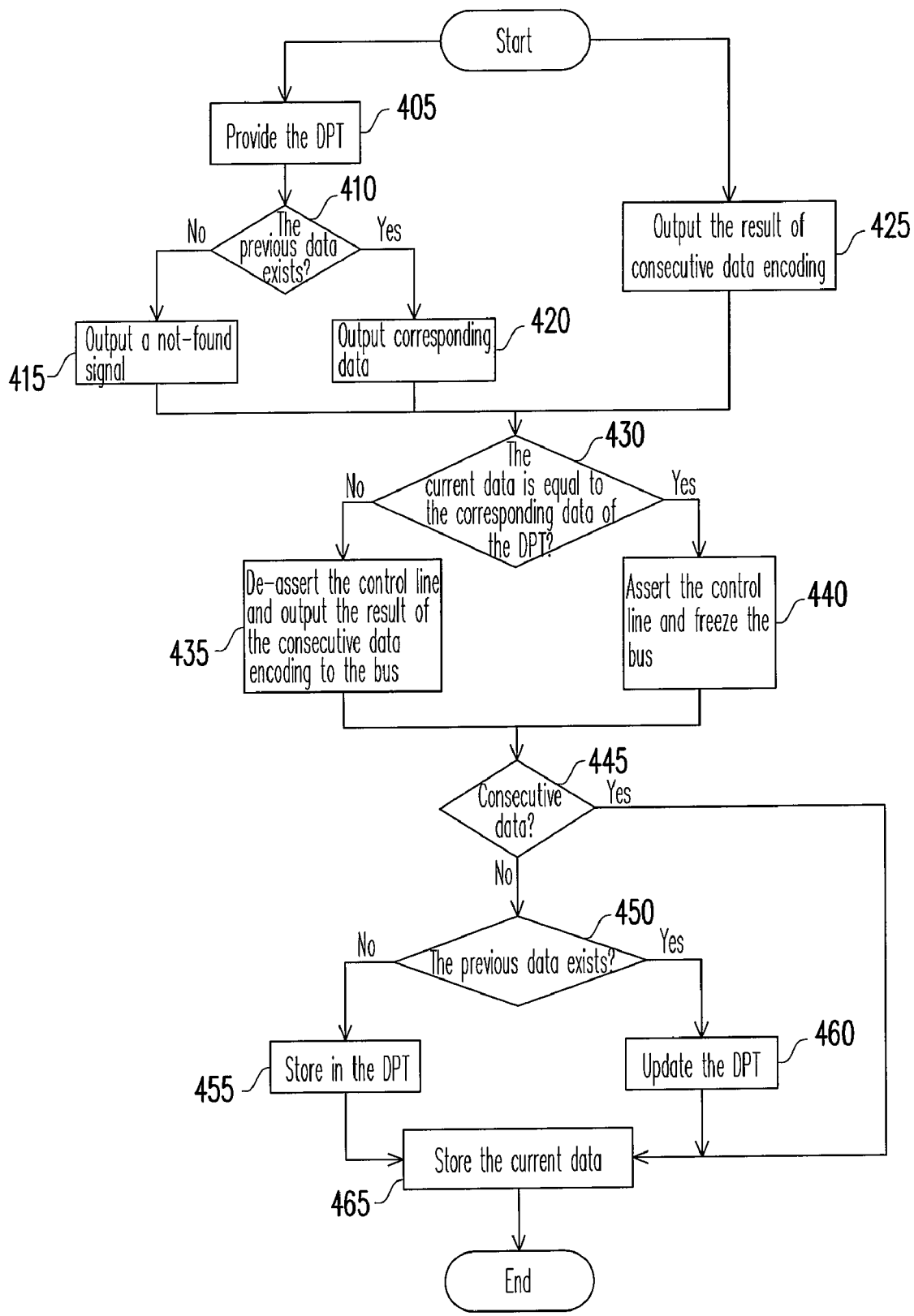
FIG. 4 is a flow chart of the operations of the bus encoding apparatus in FIG. 3.

FIG. 3 is a block diagram of the bus encoding apparatus 115 in FIG. 1; and FIG. 4 shows the flow of the operation thereof. The bus encoding apparatus 115, used to carry out the method for bus encoding in this embodiment, includes a discontinuous pattern encoder 320, a consecutive pattern encoder 330, and a data transmitter 340. The discontinuous pattern encoder 320 further includes a data storage 321, a table lookup unit 322, a table updater 323, and a table storage 324.

The bus encoding apparatus 115 will be illustrated in detail with reference to FIG. 4. The flow is divided into two parallel parts at the beginning, Steps 405-420 in the first part show the encoding of the discontinuous data, and Step 425 in the second part shows the encoding of the consecutive data. These two parts are executed in the bus encoding apparatus 115 at the same time.

In the part of the discontinuous data, firstly, a DPT is provided to store indices and data in pairs (Step 405), and the DPT is stored in the table storage 324. Each time when the bus encoding apparatus 115 receives the data 301 to be transmitted currently, the table lookup unit 322 receives the previous data transmitted last time from the data storage 321. And then the table lookup unit 322 looks up the DPT in the table storage 324 by taking the previous data as an index (Step 410). If the DPT contains an index the same as the previous data, the table lookup unit 322 outputs data corresponding to the previous data (Step 420); otherwise, a "not-found" signal is outputted (Step 415).

In another aspect, in the part of the consecutive data, the consecutive pattern encoder 330 encodes the current data 301 through the Zero-Transition and outputs an encoded result (Step 425). Besides the Zero-Transition, the consecutive pattern encoder 330 may use any other consecutive data encoding method, such as Gray Code or burst mode. All encoding methods can be used by the consecutive pattern encoder 330, as long as they are helpful for reducing the number of bus line bit-transitions when the data is being transmitted.

The data transmitter 340 is coupled to the table lookup unit 322, the consecutive pattern encoder 330, the bus 130, and the control lines CLD and CLT. The data transmitter 340 receives the current data 301, the outputs of the table lookup unit 322, and the consecutive pattern encoder 330. And then, determine whether the current data 301 is the same as the corresponding data outputted from the table lookup unit 322 (Step 430). If the current data 301 is the same as the corresponding data, the data transmitter 340 asserts the control line CLD and freezes the bus 130 (Step 440). The "freezing" herein refers that all statuses of the bus lines 130 are maintained to be unchanged, i.e., no bit-transitions. If the current data 301 is not the same as the corresponding data in Step 430, the data transmitter 340 de-asserts the control line CLD and outputs the encoding result of the consecutive pattern encoder 330 to the bus 130 (Step 435). The consecutive pattern encoder 330 in this embodiment uses the bus 130 and the control line CLT to output the encoding result of the Zero-Transition, as shown in the paradigm in FIG. 2.

Next, the table updater 323 inspects whether the current data 301 and the previous data from the data storage 321 are consecutive (Step 445). If they are consecutive data, the flow in FIG. 4 directly enters to Step 465, omitting Steps 450-460. If they are discontinuous data, the table updater 323 further inspects whether the DPT in the table storage 324 contains an index the same as the previous data (Step 450). If such an index does not exist, the table updater 323 pairs the previous data and current data 301 up and stores them in the DPT of the table storage 324 by taking the previous data as an index (Step 455). If the same index does exist, the table updater 323 updates the corresponding data of the index by using the current data 301 (Step 460).

Finally, the data storage 321 receives and stores the current data 301 to act as the previous data in the next encoding (Step 465). The bus encoding apparatus 115 has finished the encoding and transmission of the current data 301. And then, the next data may be processed in sequence.

Figure 5:
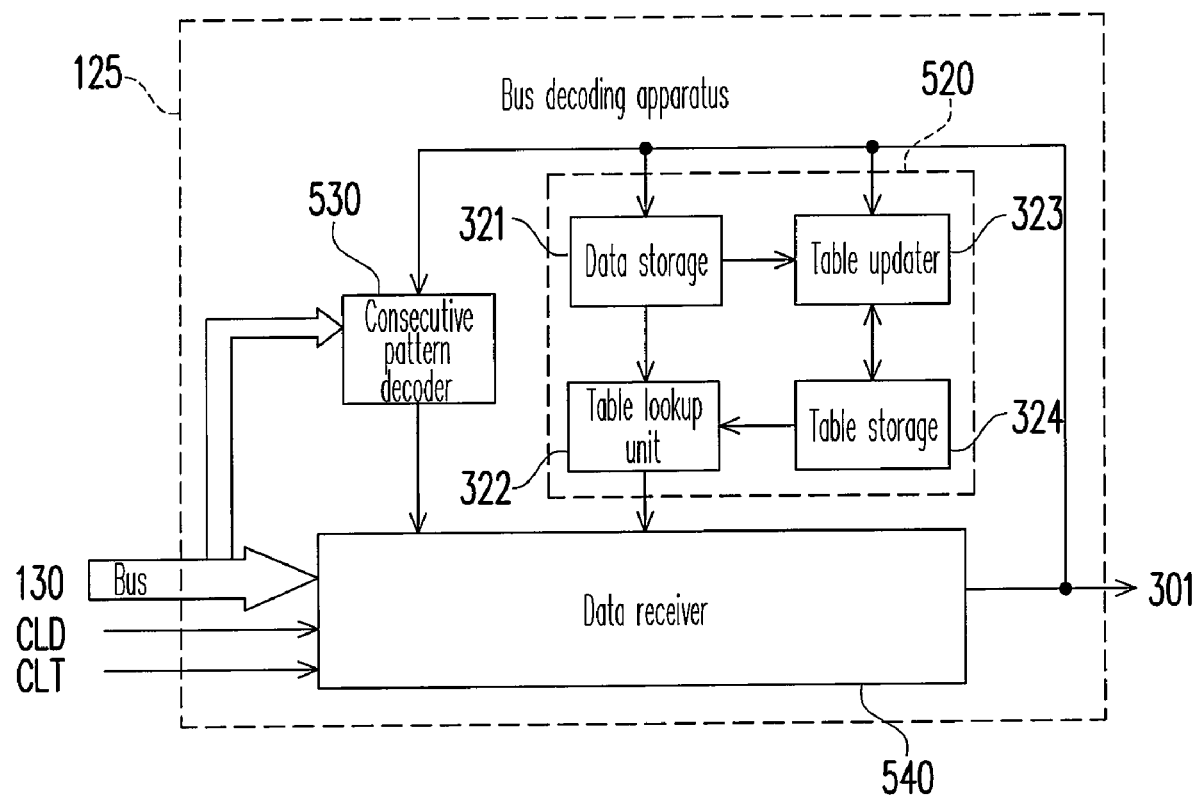
FIG. 5 is a block diagram of the bus decoding apparatus in FIG. 1.
Figure 6:
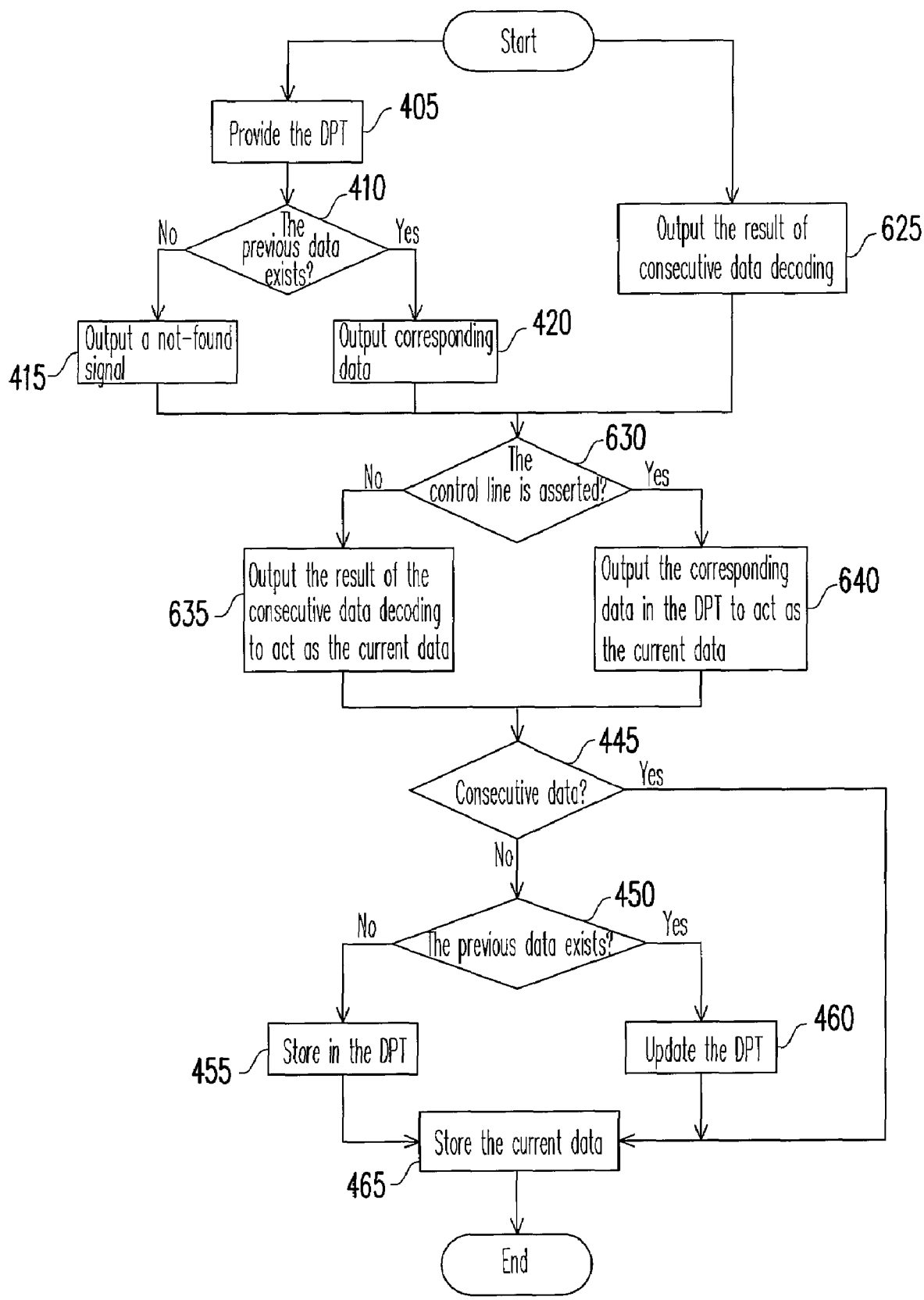
FIG. 6 is a flow chart of the operations of the bus decoding apparatus in FIG. 5.

FIG. 5 is a block diagram of the bus decoding apparatus 125 in FIG. 1 and FIG. 6 shows the flow of the operation thereof. The bus decoding apparatus 125, used to carry out the method for bus decoding in this embodiment, includes a discontinuous pattern decoder 520, a consecutive pattern decoder 530, and a data receiver 540. In fact, the discontinuous pattern decoder 520 and the discontinuous pattern encoder 320 have the same components and functions, but only the functions and connection relationship with external devices are different.

The bus decoding apparatus 125 will be illustrated in detail with reference to FIG. 6. The flow is also divided into two parallel parts at the beginning. In Steps 405-420 in the first part, the discontinuous data is decoded by the data storage 321, the table lookup unit 322, and the table storage 324, and the details can be obtained with reference to the corresponding steps in FIG. 4, which will not be repeated herein. In Step 625 in the second part, the consecutive data is decoded. These two parts are executed in the bus decoding apparatus 125 at the same time.

In the part of the consecutive data, the consecutive pattern decoder 530 coupled to the bus 130 decodes the inputs from the bus 130 and the control line CLT through the Zero-Transition, and outputs the decoded data (Step 625). The decoding method used by the consecutive pattern decoder 530 is corresponding to the encoding method used by the consecutive pattern encoder 330. Besides the Zero-Transition, the consecutive pattern decoder 530 may also use other consecutive data decoding methods in accordance with the consecutive pattern encoder 330, for example, Gray Code or burst mode.

The data receiver 540 is coupled to the table lookup unit 322, the consecutive pattern decoder 530, the bus 130, and the control lines CLD and CLT. The data receiver 540 receives the outputs of the table lookup unit 322 and the consecutive pattern decoder 530, and inspects whether the control line CLD is in an asserted status or not (Step 630). If the control line CLD is in the asserted status, the data receiver 540 outputs the corresponding data outputted from the table lookup unit 322 to act as the current data 301 (Step 640); otherwise, the data receiver 540 outputs the output data outputted from the consecutive pattern decoder 530 to act as the current data 301 (Step 635).

Next, the table updater 323 receives the previous data from the data storage 321, receives the current data 301 from the data receiver 540, and then updates the DPT in the table storage 324 by the previous data and the current data 301. Steps 445-460 for updating the DPT are the same as the corresponding steps shown in FIG. 4, which will not be repeated herein.

Finally, the data storage 321 receives and stores the current data 301 from the data receiver 540 to act as the previous data in the next decoding. Thus, till now, the bus decoding apparatus 125 has finished receiving and decoding the current data, and then processes the next data.

Figure 7:
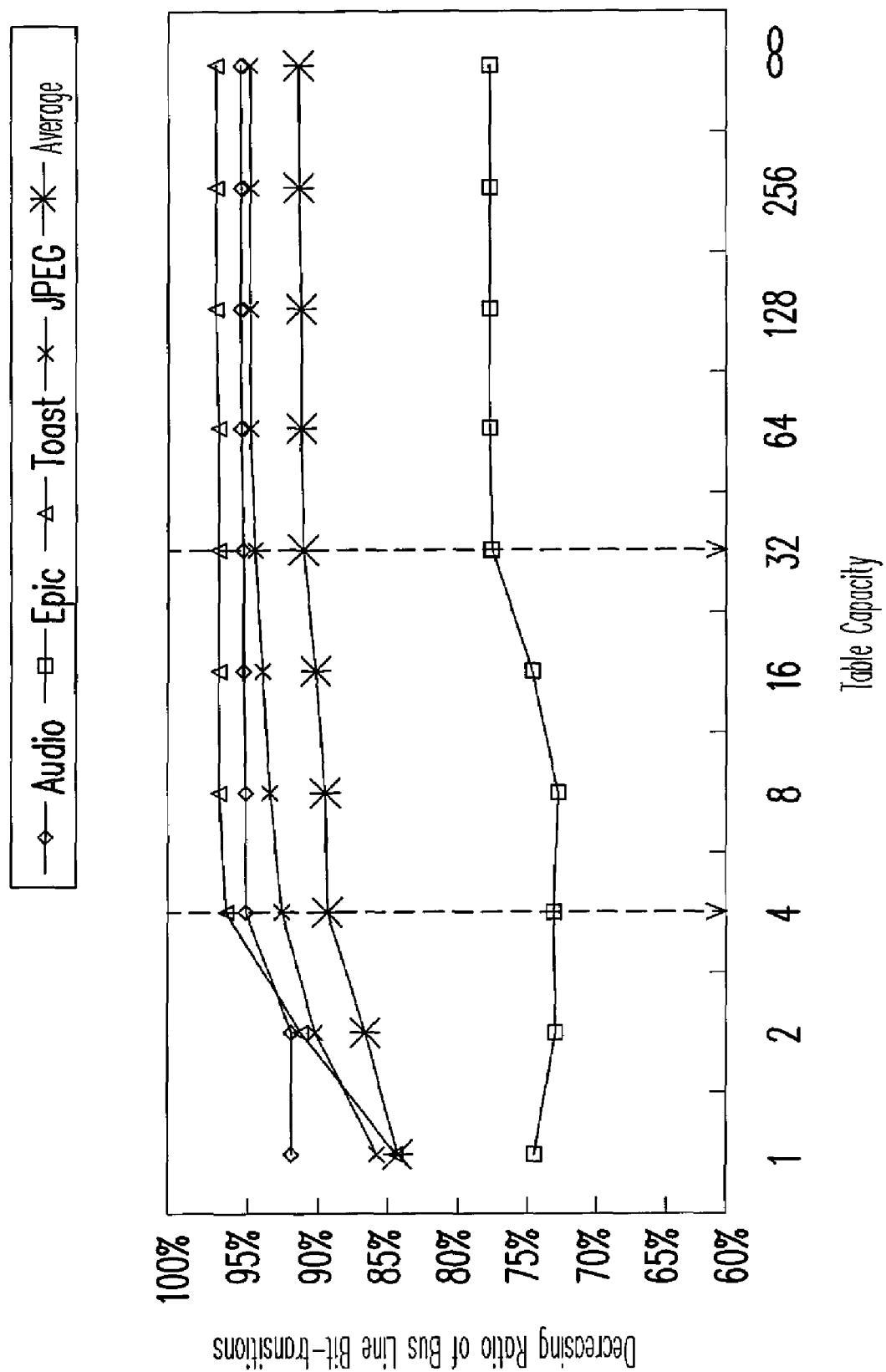
FIGS. 7 and 8 show experimental results of the method for bus encoding according to an embodiment of the present invention.
Figure 8:
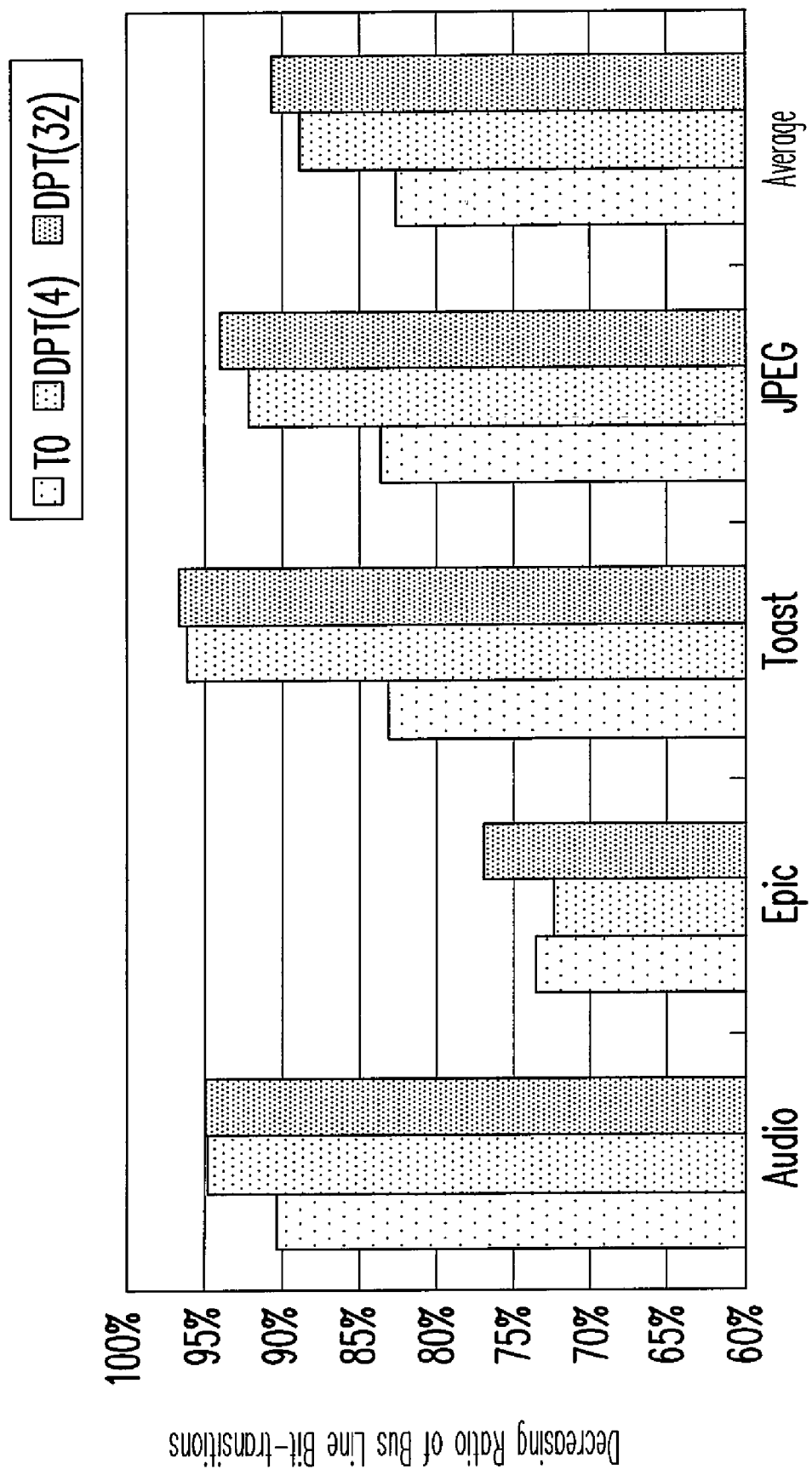

FIGS. 7 and 8 show an experimental result according to this embodiment. This embodiment uses Audio, Epic, Toast, and JPEG in the MediaBench. Audio is an audio coder and decoder using the adaptive differential pulse-code modulation (ADPCM). Epic is an efficient pyramid image coder. Toast is a full-rate speech trans-coder of the Global System for Mobile Communications (GSM). JPEG is an image compression and decompression program that meets the Joint Photographic Experts Group (JPEG).

This experiment employs a method for encoding data using the DPT together with the Zero-Transition. The above four test programs are executed. The times of status conversion of the wires of the instruction address bus are calculated. The decreasing ratio relative to the times of bus line bit-transitions without any encoding process is calculated. The average decreasing ratio of the times of status conversion for the above four test programs is also calculated. The experimental result is shown in FIG. 7. The vertical axis represents the decreasing ratio of the bus line bit-transitions. The horizontal axis represents the capacity of the DPT, i.e., the number of the data pairs that can be accommodated in the DPT.

FIG. 8 shows the decreasing ratios of the times of status conversion of the bus wires when the four test programs are executed through three different methods for bus encoding respectively. FIG. 8 also shows the average decreasing ratio of the times of status conversion for the four test programs under the three different encoding methods. T0 represents using the Zero-Transition, DPT(4) represents the Zero-Transition and the DPT with a capacity of 4, and DPT(32) represents the Zero-Transition and the DPT with the capacity of 32. It can be seen from FIG. 8 that, the DPT in this embodiment truly can decrease the times of status conversion of the bus for the discontinuous data, and especially have better effects for the large-capacity DPT.

The following Table 3 shows the comparative data of the average experimental results for the two encoding methods, i.e., the Zero-Transition and the DPT with the capacity of 4; the Zero-Transition and the DPT with the capacity of 32.

TABLE 3

| Comparison of experimental results | | |
| --- | --- | --- |
| Table Capacity | 4 | 32 |
| Decreasing Ratio of Times of Status Conversion | 88.7% | 90.5% |
| Ratio of Optimum Situation | 97.6% | 99.8% |
| Superior than Zero Transition | 6.2% | 8.1% |

The decreasing ratio of the times of status conversion in FIG. 3 is the same as the data in FIG. 8. The optimum situation refers to the decreasing ratio of the times of status conversion when the capacity of the DPT is increased unlimitedly, and the ratio of the optimum situation is the ratio of the decreasing ratio of limited capacity in Line 2 of Table 3 to the optimum situation. That is to say, the Zero-Transition and the DPT with the capacity of 4 have reached 97.6% of the optimum situation, and the Zero-Transition and the DPT with the capacity of 32 have reached 99.8% of the optimum situation. Finally, Line 4 of Table 3 shows the decreasing amount of times of status conversion of the bus through the Zero-Transition and the DPT relative to that only through the Zero-Transition, i.e., the contribution degree of the DPT.

In view of the above, the present invention may encode and decode consecutive data and discontinuous data to make most of data be transmitted without passing through the bus. Therefore the times of bus line bit-transitions are greatly decreased. The benefit includes reducing the power consumption of the bus and the waste heat generated by the system, enhancing the system stability, and elongating the operating time of the system. Besides the instruction address bus, the present invention can also be used in other types of buses, including a common bus connecting a plurality of system devices and a one-to-one special bus. All buses may be applicable for the present invention, as long as they often transmit the consecutive data or the discontinuous data appear repeatedly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for bus encoding, comprising:
   a discontinuous pattern encoder, with a built-in discontinuous pattern table (DPT) to store indices and data in pairs;
   a consecutive pattern encoder, for encoding a current data through a consecutive data encoding method and outputting an result of the encoding; and
   a data transmitter, coupled to the discontinuous pattern encoder, the consecutive pattern encoder, a bus, and a control line.

2. The apparatus for bus encoding as claimed in claim 1, wherein if a previous data and the current data are discontinuous and the DPT does not contain an index the same as the previous data, the previous data and the current data are paired up and stored in the DPT by taking the previous data as an index; and if the DPT contains an index the same as the previous data, the data corresponding to the previous data is outputted.

3. The apparatus for bus encoding as claimed in claim 2, wherein if the current data is equal to the output data of the discontinuous pattern encoder, the control line is asserted and the bus is frozen; otherwise, the control line is de-asserted and the encoding result of the consecutive pattern encoder is outputted to the bus.

4. The apparatus for bus encoding as claimed in claim 2, wherein the discontinuous pattern encoder comprises:
   a data storage, for receiving and storing the current data to act as the previous data in the next encoding;
   a table storage, for storing the DPT;
   a table lookup unit, for receiving the previous data from the data storage and querying the DPT by taking the previous data as an index, wherein if the DPT contains an index the same as the previous data, the data corresponding to the previous data is outputted; otherwise, a not-found signal is outputted; and
   a table updater, for receiving the previous data from the data storage, wherein if the previous data and the current data are discontinuous and the DPT does not contain an index the same as the previous data, the previous data and the current data are paired up and stored in the DPT by taking the previous data as an index.

5. The apparatus for bus encoding as claimed in claim 4, wherein if the previous data and the current data are discontinuous and the DPT contains an index the same as the previous data, the table updater updates the corresponding data of the index by using the current data.

6. The apparatus for bus encoding as claimed in claim 1, wherein the consecutive data encoding method is Zero-Transition, Gray Code, or burst mode.

7. An apparatus for bus decoding, comprising:
   a discontinuous pattern decoder, with a built-in DPT to store indices and data in pairs;
   a consecutive pattern decoder, coupled to a bus, for decoding an input from the bus through a consecutive data decoding method, and then outputting the decoded data; and
   a data receiver, coupled to the discontinuous pattern decoder, the consecutive pattern decoder, the bus, and a control line.

8. The apparatus for bus decoding as claimed in claim 7, wherein if a previous data and a current data are discontinuous and the DPT does not contain an index the same as the previous data, the previous data and the current data are paired up and stored in the DPT by taking the previous data as an index; and if the DPT contains an index the same as the previous data, the data corresponding to the previous data is outputted.

9. The apparatus for bus decoding as claimed in claim 8, wherein if the control line is in an asserted status, the output data of the discontinuous pattern decoder acts as the current data, otherwise, the output data of the consecutive pattern decoder acts as the current data.

10. The apparatus for bus decoding as claimed in claim 7, wherein the discontinuous pattern decoder comprises:
    a data storage, for receiving and storing the current data from the data receiver to act as the previous data in the next decoding;
    a table storage, for storing the DPT;
    a table lookup unit, for receiving the previous data from the data storage and querying the DPT by taking the previous data as an index, wherein if the DPT contains an index the same as the previous data, the data corresponding to the previous data is outputted; otherwise, a not-found signal is outputted; and
    a table updater, for receiving the previous data from the data storage and receiving the current data from the data receiver, wherein if the previous data and the current data are discontinuous and the DPT does not contain an index the same as the previous data, the previous data and the current data are paired up and stored in the DPT by taking the previous data as an index.

11. The apparatus for bus decoding as claimed in claim 10, wherein if the previous data and the current data are discontinuous and the DPT contains an index the same as the previous data, the table updater updates the corresponding data of the index by using the current data.

12. The apparatus for bus decoding as claimed in claim 7, wherein the consecutive data decoding method is Zero-Transition, Gray Code, or burst mode.

13. A method for bus encoding, comprising:
    (a) providing a DPT to store indices and data in pairs;
    (b) if the DPT contains an index the same as a previous data, outputting the data corresponding to the previous data;
    (c) encoding a current data through a consecutive data encoding method, and outputting a result of the encoding; and
    (d) if the current data is equal to the output data in Step (b), asserting a control line and freezing a bus; otherwise, de-asserting the control line and outputting the encoding result in Step (c) to the bus.

14. The method for bus encoding as claimed in claim 13, wherein if the previous data and the current data are discontinuous and the DPT does not contain an index the same as the previous data, the previous data and the current data are paired up and stored in the DPT by taking the previous data as an index.

15. The method for bus encoding as claimed in claim 13, comprising: if the previous data and the current data are discontinuous and the DPT contains an index the same as the previous data, updating the corresponding data of the index by using the current data.

16. The method for bus encoding as claimed in claim 14, comprising storing the current data to act as the previous data in the next encoding.

17. The method for bus encoding as claimed in claim 13, wherein the consecutive data encoding method is Zero-Transition, Gray Code, or burst mode.

18. A method for bus decoding, comprising:
    (a) providing a DPT to store indices and data in pairs;
    (b) if the DPT contains an index the same as a previous data, outputting the data corresponding to the previous data;

(c) decoding an input from a bus through a consecutive data decoding method, and outputting the decoded data; and (d) if a control line is in an asserted status, outputting the output data in Step (b) as a current data; otherwise, outputting the output data in Step (c) as the current data.

19. The method for bus decoding as claimed in claim 18, wherein if the previous data and the current data are discontinuous and the DPT does not contain an index the same as the previous data, the previous data and the current data are paired up and stored in the DPT by taking the previous data as an index.

20. The method for bus decoding as claimed in claim 18, comprising: if the previous data and the current data are discontinuous and the DPT contains an index the same as the previous data, updating the corresponding data of the index by using the current data.

21. The method for bus decoding as claimed in claim 19, comprising storing the current data to act as the previous data in the next decoding.

22. The method for bus decoding as claimed in claim 18, wherein the consecutive data decoding method is Zero-Transition, Gray Code, or burst mode.

* * * * *